(No Model.)

H. SCHNEIDER.
ROTARY WATER METER.

No. 319,134. Patented June 2, 1885.

WITNESSES:
Fred. G. Dieterich.
J. E. Prosperi.

INVENTOR.
H. Schneider
per J. A. Lehmann,
ATTORNEY.

UNITED STATES PATENT OFFICE.

HUGO SCHNEIDER, OF CLEVELAND, OHIO.

ROTARY WATER-METER.

SPECIFICATION forming part of Letters Patent No. 319,134, dated June 2, 1885.

Application filed December 19, 1884. (No model.)

*To all whom it may concern:*

Be it known that I, HUGO SCHNEIDER, of Cleveland, in the county of Cuyahoga and State of Ohio, have invented certain new and useful Improvements in Meters; and I do hereby declare the following to be a full, clear, and exact description of the invention, such as will enable others skilled in the art to which it pertains to make and use it, reference being had to the accompanying drawings, which form part of this specification.

My invention relates to an improvement in water-meters; and it consists in the combination of the water-way and the wheel placed therein with the passages through which the water wastes past the wheel, and a cock placed in the passage so as to control the flow of water through the passage, as will be more fully described hereinafter.

The object of my invention is to provide a waste-passage through the meter, so that a regulated amount of water can be allowed to pass through the meter without operating upon the wheel, and thus equalize the number of revolutions of the operating-wheel with the actual amount of water that passes through the meter.

Figure 1:
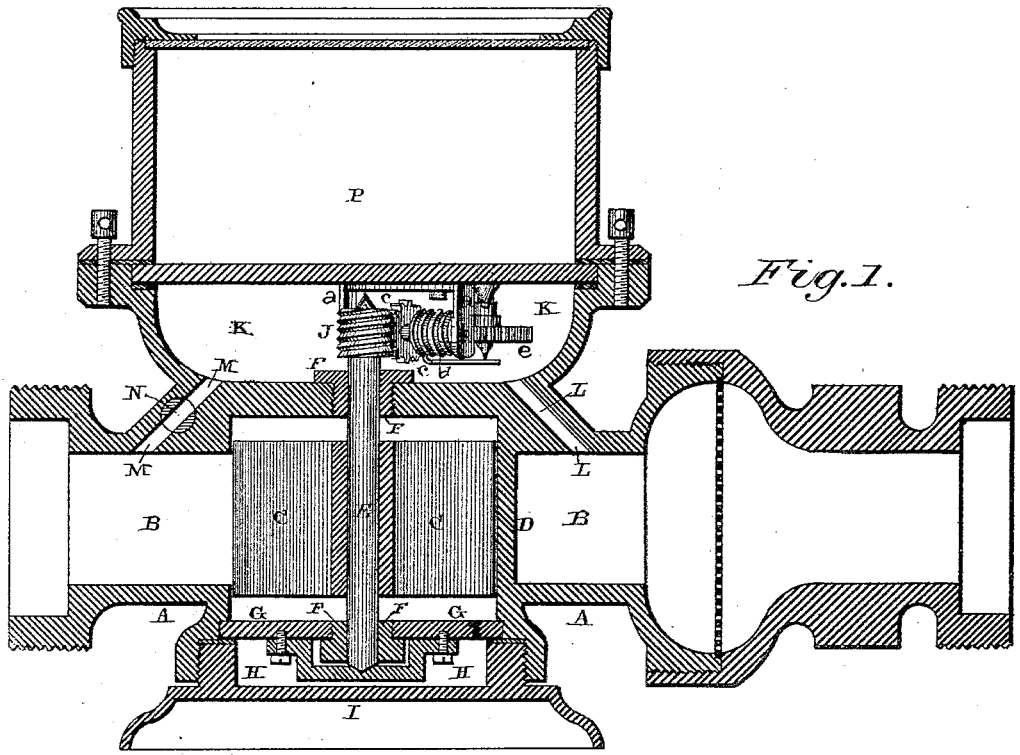
Figure 2:
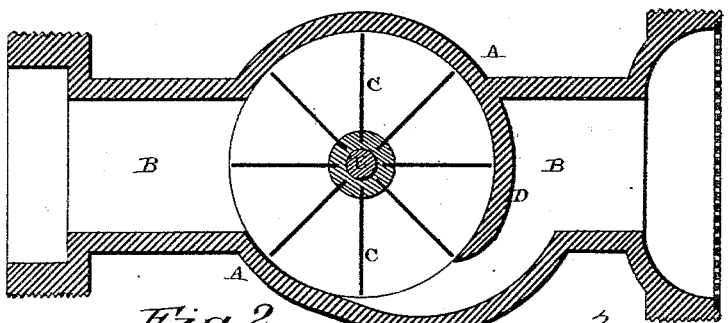
Figure 3:
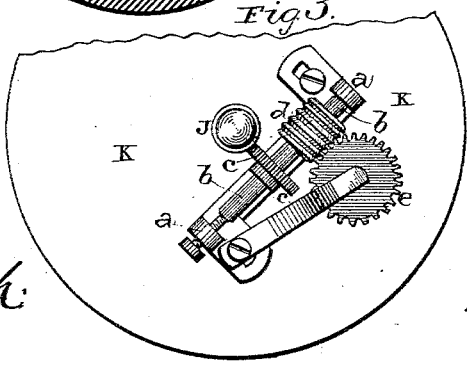

Figure 1 is a vertical section of a meter embodying my invention. Fig. 2 is a horizontal section of the same. Fig. 3 is a detail view.

A represents the body of the meter, through which the water-way B is made. In the center of this water-way is journaled the wheel C, and in the front of the wheel is formed the curved wall or deflector D, which serves to turn the water to one side out of its course, so as to cause the water to strike the wheel on one side, as shown. This curved wall also forms a sort of a chamber, in connection with the other parts of the frame, in which the wheel revolves. By delivering the water at the side of the wheel a freer movement of the wheel is obtained, for there is less friction of the water upon it and less friction upon the bearings. The upper and lower ends of the wheel-shaft E are passed through suitable packing-nuts, F, which serve to prevent all leakage at these points. The bottom G of the wheel-chamber is made removable, and the step for the shaft is secured to its under side, as shown. Through this bottom is made an opening, through which the water flows and fills the chamber H, for the purpose of lubricating the bearing of the wheel and to prevent leakage. The bottom of the chamber is formed by the screw-plug I, which is removed whenever the wheel is to be removed or any repairs made.

Upon the upper end of the wheel-shaft is formed the worm J, which is located in the center of a saucer-shaped chamber, K, as shown. This chamber is connected with the water-way at L so that the water will flow freely into the chamber as it flows toward the wheel, but without having any influence upon the wheel in any way. Leading from this chamber, on the opposite side of the wheel, is the escape-passage M, through which the water flows from the chamber. In this escape-passage is a stop-cock, N, by means of which the flow of water through the chamber is regulated. This leakage of water past the wheel without being registered is for the purpose of equalizing any discrepancy between the quantity of water measured and the number of revolutions of the wheel. For instance, a machine of a certain size is intended to have the wheel make one hundred revolutions to register one cubic foot of water; but by actual measurement the wheel has to make one hundred and five revolutions. In this case the outlet-passage is so adjusted by the stop-cock that the amount of water represented by five turns of the wheel is allowed to leak past the wheel without being registered. In this way the machine can always be adjusted so as to measure accurately. If no provision were made for thus rectifying the error made by the wheel, a mistake of five turns of the wheel would be made for every cubic foot that is registered, which would amount to a large sum in a short time. The worm J is placed in the center of the chamber K, and the other portions of the mechanism that engages with it are so placed that they will engage with the worm in any position that the chamber P, in which the registering devices are placed, is turned. Secured to the under side of the chamber P are the bearings $a$, in which is journaled the shaft $b$, upon which is the spur-wheel $c$, to mesh with the worm J and the worm $d$. Journaled upon the bottom of the chamber P, beyond the shaft b, is the wheel e, which meshes with the worm d. The shaft of this wheel projects up through into the chamber P and operates the registering mechanism. Two worms being used, and the wheel e being placed outside of the shaft, the registering mechanism connects with the worm J in whatever position the chamber is turned. By this construction the figures can always be turned toward the front or light and thus be easily read. Where the parts are not arranged concentrically, as here shown, they must be put together only in certain positions, and then the numbers cannot be turned in the most convenient position for reading them.

Having thus described my invention, I claim—

In a meter, the combination of the water-way, the wheel placed therein, with the passages through which the water wastes past the wheel, and a cock placed in the passage so as to control the flow of water through the passage, substantially as set forth.

In testimony whereof I affix my signature in presence of two witnesses.

HUGO SCHNEIDER.

Witnesses:
A. H. WEED,
Z. DAVIS.